United States Patent [19]

Jones

[11] Patent Number: 5,090,238
[45] Date of Patent: Feb. 25, 1992

[54] OIL WELL PRODUCTION TESTING

[75] Inventor: Jeffrey A. Jones, Keene, Calif.

[73] Assignee: Santa Fe Energy Resources, Inc., Houston, Tex.

[21] Appl. No.: 588,748

[22] Filed: Sep. 27, 1990

[51] Int. Cl.⁵ .......................................... E21B 47/10
[52] U.S. Cl. ...................................... 73/155; 73/61 R
[58] Field of Search ................. 73/155, 861.04, 61.1

[56]  References Cited
U.S. PATENT DOCUMENTS

| | | | |
|---|---|---|---|
| 2,082,329 | 6/1937 | Foran | 255/24 |
| 2,916,916 | 12/1959 | Holsclaw | 73/427 |
| 2,936,618 | 5/1960 | Milam | 73/194 |
| 2,962,894 | 12/1960 | Banks et al. | 73/155 |
| 3,014,362 | 12/1961 | True et al. | 73/53 |
| 3,298,227 | 1/1967 | Hicks | 73/155 |
| 3,674,053 | 7/1972 | Murman et al. | 138/30 |
| 4,429,581 | 2/1984 | Furmaga | 73/861 |
| 4,501,325 | 2/1985 | Frazier et al. | 166/265 |
| 4,596,136 | 6/1986 | Zacharias | 73/861.04 |
| 4,727,489 | 2/1988 | Frazier et al. | 364/422 |
| 4,836,017 | 6/1989 | Bozek | 73/155 |

OTHER PUBLICATIONS

EZ-OCI-AWT (date of sketch unknown).

Primary Examiner—Jerry W. Myracle
Attorney, Agent, or Firm—Frederick E. Mueller

[57]  ABSTRACT

Oil well production fluid is gravitationally segregated into different phase within a tank whose top has a regulated exhaust line to remove any gas phase. An outlet end of the tank has a water phase discharge line from a lower region and an emulsion phase discharge line from the upper region of the tank. Both discharge lines have normally closed dump valves that are operationally coupled to a pneumatic actuator and a probe that measures the electrical capacitance of the oil emulsion and water phases that are alternately present at an intermediate level of the tank. Oil emulsion overflows from the liquid packed tank into a downcomer that opens into the upper region of a water manifold to displace water out of the lower region of the manifold and into a water chamber on one side of a bladder of a pressure vessel. A gas charged chamber of the pressure vessel is operatively coupled to a high-low pressure switch that is electrically coupled to the probe. A high gas pressure effects closing of the high-low switch and consequent opening of one of the normally closed valves to dump the particular liquid phase detected by the probe at the intermediate level of the tank by the decompression of the gas chamber of the pressure vessel. Decompression of the gas chamber of the pressure vessel opens the high-low switch to effect closing of the previously opened valve.

17 Claims, 3 Drawing Sheets

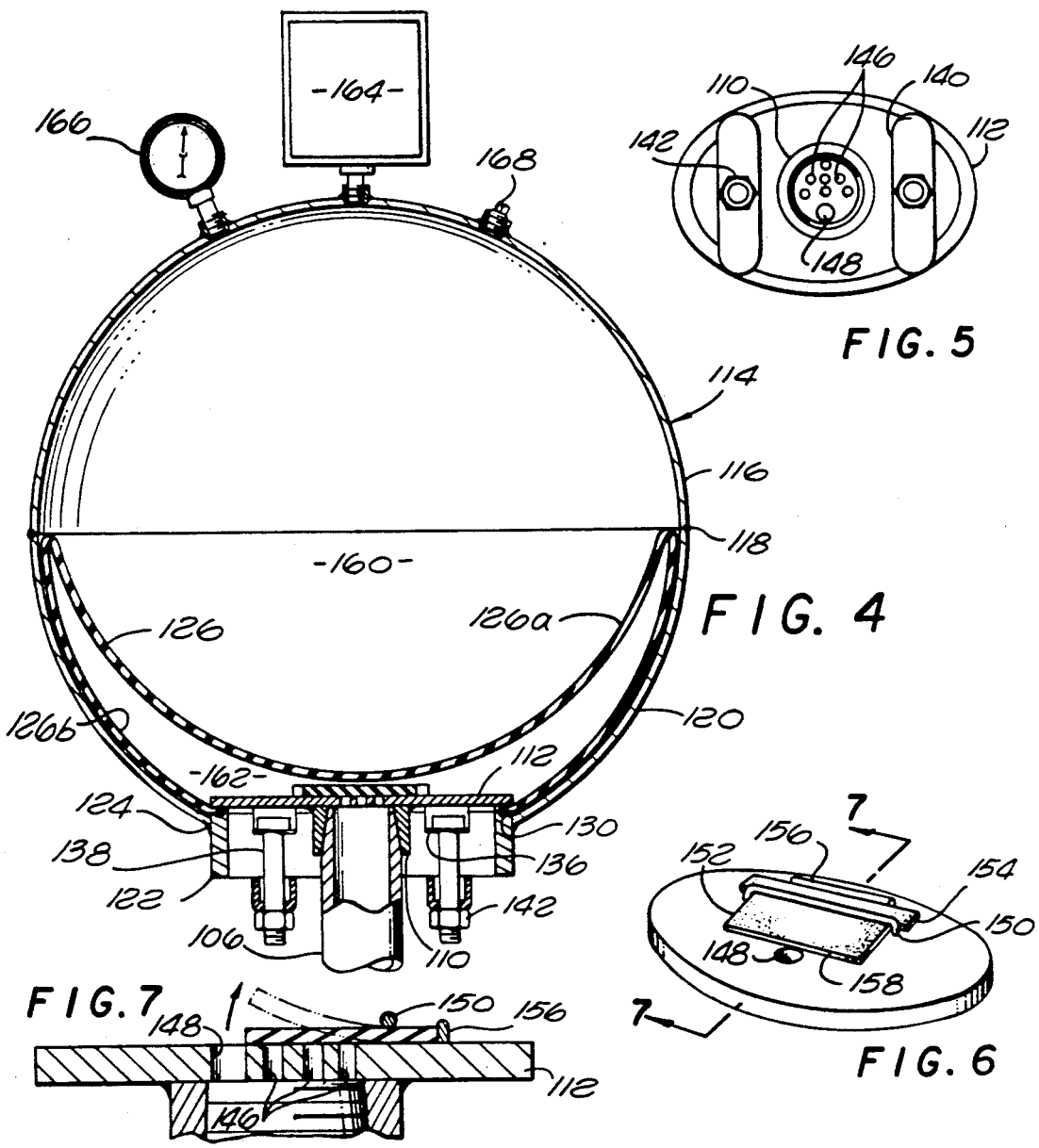

OIL WELL PRODUCTION TESTING

BACKGROUND OF THE INVENTION

The present invention relates generally to oil well production testing and, more particularly, to oil well production testing that separates the oil emulsion, free water and gas phases of the well fluid by gravity segregation for subsequent measurement of each phase separately.

Oil well production testers which operate by gravity segregation are commonly used in heavy oil production operations. Typically, the apparatus comprises a horizontally elongate tank or vessel into which the production fluid is introduced at one end to fill the test vessel and undergo gravity segregation into gas, oil emulsion and water phases which typically occupy the top, middle and bottom thirds of the vessel respectively. At its other end, the test vessel is internally fitted with a weir box whose upper edge is spaced about one-third vessel diameter below the upper surface of the test vessel to establish the liquid/gas interface level of the contained fluids. As the three phases of the produced fluid segregate by gravity, the liquid/gas interface rises to the level of the top of the weir box wall, and the lighter oil emulsion spills over the upper edge of the wall and is so segregated from the free water. Thus, the apparatus commonly operates in a three phase condition consisting of a gas blanket in the top third of the vessel, an oil emulsion layer in the middle third of the vessel and a heavier free water layer in the bottom of the vessel.

Outside of the weir box, the test vessel contains an adjacent oil/water interface probe located at a level approximately one-third vessel diameter up from the floor of the vessel. The oil/water interface probe is operatively coupled to a valve in a discharge line for withdrawing free water from the test vessel, the discharge line being metered for the measurement of the water passing therethrough. The weir box contains a float switch at an elevation above that of the oil/water interface probe, so that as oil emulsion in the weir box rises to a level to actuate the float switch, a valve is actuated to open a metered discharge line for the emulsion. The top of the test vessel includes a chamber into which the gas phase is communicated and is fitted with mechanisms for alternatively introducing make-up gas to or removing gas from the gas blanket in a manner to maintain a substantially constant pressure of the gas within the vessel.

In order for this apparatus to operate satisfactorily, it must maintain the gas blanket at a substantially constant pressure above the upper edge of the weir box. As gas is highly compressible, the pressurized gas pad provides stored energy to expel fluid during the oil and water dump cycles. However, many oil wells produce fluid which is undersaturated in gas. Accordingly, testing of these wells not only requires an initial gas precharge but, also, a constant supply of expensive make-up gas since the undersaturated fluids constantly absorb gas. The gas blanket is a potential safety hazard since, as it is both combustible and under pressure, it presents a constant danger of explosion.

A further disadvantage of this apparatus arises from the size of the weir box, which is necessarily relatively small to accommodate adequate total test vessel volume for gravity segregation of the oil emulsion. Thus, an oil emulsion dump from the weir box during a test sequence is, in turn, small, typically about 4 gallons. It follows that, for a significant portion of its operating time, the oil meter is either accelerating to or decelerating from operating speed, which greatly detracts from meter efficiency. Similarly, a water dump is of short and inefficient duration since it is a function of the oil/water interface falling only a fraction of an inch past the interface probe.

Since the duration of the oil and water dumps is short, the piping and dump valves associated therewith must be of a large size. Accordingly, the oil and water meters tend to run in excess of their rated speed and generate inaccurate readings. The use of flow restrictors in the outlet lines to remedy meter overrunning is impractical since much debris flows through these test vessels and a properly sized orifice would be repeatedly plugged up. Additionally, oil viscosity from the various wells served by a single oil well tester is too variable to allow a single flow restrictor size. Accordingly, not only are the meter readings inaccurate but meter repair costs are high due to meter overrunning.

SUMMARY OF THE INVENTION

The foregoing and other disadvantages of previous oil well testers are eliminated by the present invention. Briefly, the invention provides an improved oil well production test method with a test vessel which operates liquid packed at variable pressure, without a weir box, without the necessity for addition of make-up gas, regulates the speeds of the oil and water meters and achieves larger volume dumps of oil and water.

More particularly, the invention comprises a horizontally elongate test vessel or tank that in one domed end is fitted with an intake pipe for the reception of the fluids produced by a selected one of a number of wells. If desired, the tank may be internally fitted with a pipe loop connected to an external source of heat, the pipe loop serving as a heat exchanger to allow heating of cold oil in order to facilitate testing. On its upper surface, the test vessel or tank has a gas removal means which may comprise an auxiliary chamber which communicates with the interior of the tank to permit the gas phase of the well fluid, if present, to be constantly withdrawn from the test vessel through a fluid level regulated, valve controlled exhaust line.

The fluid components of the well fluid undergo gravity segregation within the test vessel. When the test vessel or tank is liquid packed, a portion of the lighter oil emulsion overflows from the top of the vessel through a pipe of inverted U-shape having one end opening in communication with a vertically extending tubular downcomer adjacent to the inlet end of the test vessel. A lower end of the downcomer opens into communication with a horizontally disposed elongate manifold that is precharged with fresh water. The fresh water of the manifold and emulsion present in the downcomer define a fresh water/emulsion interface which is preferably maintained within the vertical range of the downcomer, although the interface can occur within the manifold. At that end of the water manifold opposite to the downcomer, a valve controlled upstanding pipe communicates at its lower end with the interior of the manifold and at an upper end with the interior of accumulator means preferably comprising a spherical pressure vessel that is horizontally divided by an internal flexible bladder into a lower liquid chamber and an upper hermetically sealed gas chamber. The gas chamber of the pressure vessel is precharged with nitrogen to a predetermined pressure, the bladder vessel being externally fitted with a high-low pressure switch in operative association with the nitrogen gas region of the bladder vessel. The water precharge manifold is sized to contain a volume at least equal to the volume of the bladder vessel.

A domed outlet end of the test vessel is fitted with a first discharge port or nozzle for exhausting free water from the interior of the test vessel as well as a second discharge port or nozzle for exhausting oil emulsion. The latter is located at a higher elevation than the water discharge port and is connected to a water cut probe. Both ports communicate with metered pipe strings whose downstream ends have normally closed pneumatic dump valves operatively associated therewith. At an elevation intermediate that of the free water and oil emulsion discharge ports, the outlet end of the test vessel is also fitted with a selector means comprising an oil/water interface probe. An end of the probe within the test vessel is responsive to the specific gravity or electrical capacitance of oil emulsion and free water and functions as a switch or gate to close a circuit to effect opening of either the water or oil dump valve corresponding to which of the two liquids is then at the level of the probe. The selector means probe is in operative association with an electrical power switch comprising a high-low pressure switch that is coupled to the nitrogen gas region of the bladder vessel.

In operation, gas, if present, is continuously eliminated from the well fluids within the test vessel by the operation of the float switch controlled gas dump valve. When the emulsion and water dump valves are closed, the gas having been drawn off, the test vessel is entirely liquid packed with oil emulsion over the free water. A portion of the emulsion overflows through the interconnecting tubing to the upper end of the downcomer and defines a fresh water/emulsion interface, preferably within the vertical range of the downcomer. As well fluid is pumped into the test vessel, some of the water precharge in the manifold is displaced upwardly into the lower chamber of the bladder vessel to, in turn, upwardly displace the rubber bag to compress the nitrogen in the upper chamber of the bladder vessel.

When a preset high gas pressure is reached the high-low pressure switch closes and the oil/water interface probe selects which valve to open, i.e., switching the circuit to a pneumatic actuator for either the oil emulsion or water dump valve. The appropriate dump valve is then opened pneumatically whereby the energy of the compressed gas within the bladder vessel is transmitted to and displaces water in the bladder vessel and manifold, emulsion in the downcomer and interconnecting tubing, and the liquid in the packed test vessel to expel emulsion or water through the corresponding oil emulsion or water discharge port or nozzle. The exhaust phase continues until a low preset pressure within the gas chamber vessel is sensed by the high-low pressure switch to open the electrical circuit and effect closing of the corresponding dump valve.

The upper end of the upstanding pipe communicating one end of the water manifold with the liquid chamber of the bladder vessel is fitted with a check valve means adjacent to a flow restrictor orifice. The flow orifice is continuously open and restricts exhausting of water from the bladder vessel to a rate that will effect driving of oil emulsion and water out of the test vessel and through the meters associated with the exhaust piping to a rate to prevent overrunning of the meters in a phase of operation when the check valve means is closed. On the other hand, in a phase when water from the manifold is being forced through the upstanding pipe and into the bladder vessel, the check valve means is open, as is the restrictor orifice, so that pressure shock waves travelling from the producing well into the fluid packed test vessel are readily transmitted into the gas-damped rubber bag of the bladder vessel.

BRIEF DESCRIPTION OF THE DRAWINGS

FIG. 4 is a vertical sectional view of the bladder vessel component of the apparatus, on an enlarged scale, taken on the line 4—4 of FIG. 1.

FIG. 5 is a bottom plan view of a closure plate for the bladder vessel of FIG. 4 illustrating the flow restrictor orifice and check valve openings adjacent thereto.

FIG. 6 is a top perspective view of the component of FIG. 5.

FIG. 7 is a sectional view taken on the line 7—7 of FIG. 6.

FIG. 8 is a schematic diagram of another embodiment of the invention.

DESCRIPTION OF THE PREFERRED EMBODIMENT

Figure 1:
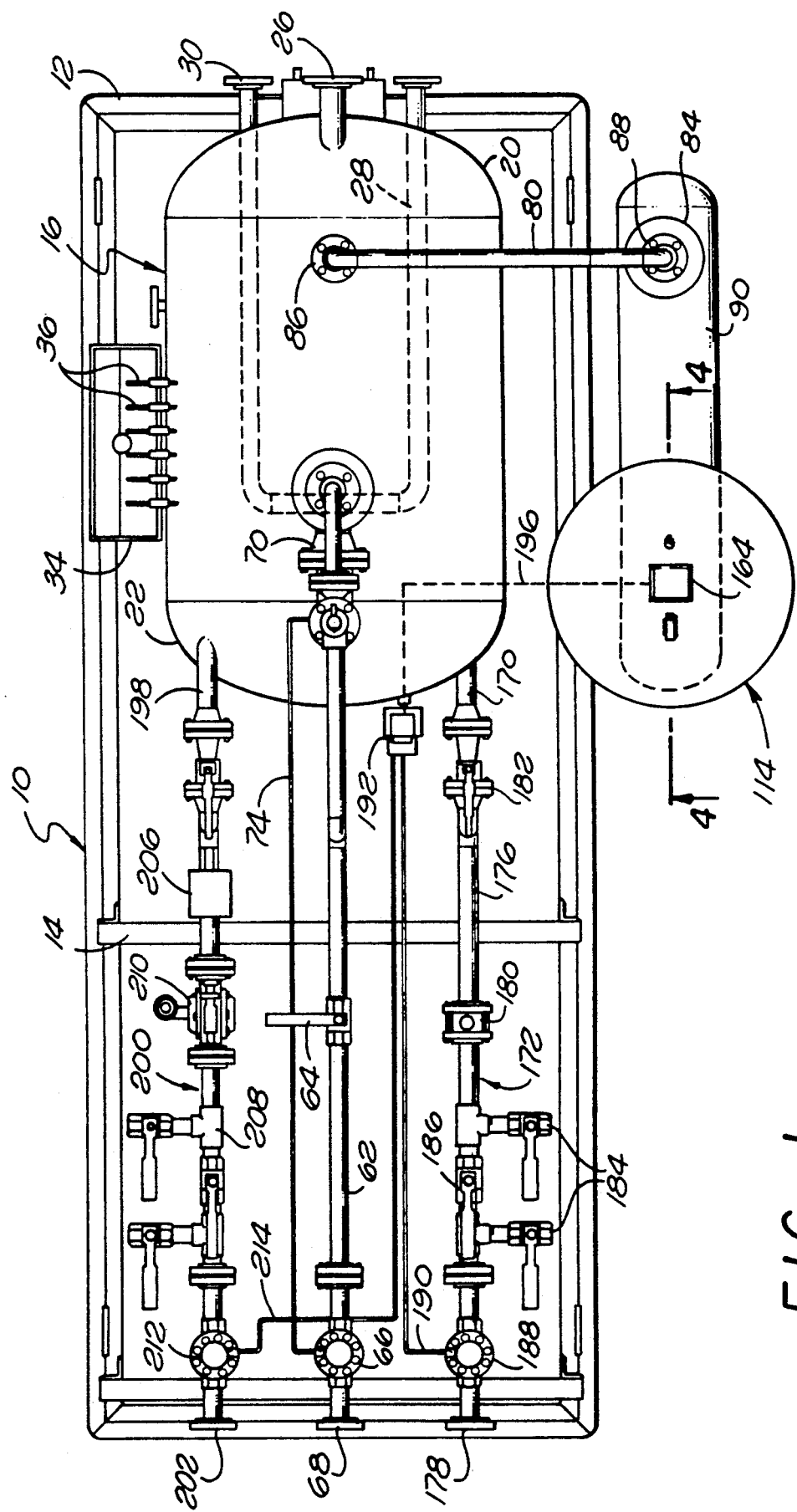
FIG. 1 is a top plan view of apparatus embodying my invention.

Before explaining the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

The apparatus of the invention may, if desired, comprise a unitary assembly of components supported on a conventional base framework 10. As indicated in FIG. 1, the framework 10 may, for example, comprise a rectangular frame of conventional angle iron members spanned at appropriate intervals by cross members 14. At one end portion, the framework 10 supports a horizontally elongate test vessel 16 in an elevated position on appropriate cradles or standards. The test vessel is also of a conventional construction comprising a cylindrical main center section 18 closed at opposite ends by an inlet dome 20 and an exhaust end dome 22.

The inlet end 20 of the test vessel is fitted with a flanged inlet nozzle 26 preferably situated in the upper half of the domed inlet end along the midline thereof. While not shown, it should be understood that inlet nozzle 26 is normally connected to the downstream end of a string of pipe through which oil well production fluid is pumped into the test vessel 16. The upstream end of this induction pipe string typically is under the control of a selector valve by means of which the fluid from any one of a number of oil wells may be diverted to the test vessel 16 for measurement of its gas and liquid phases. In order to permit heating of cold oil in order to improve the test results, the vessel 16 may also be fitted with an internal pipe loop 28 having flanged fittings 30 protruding horizontally through the inlet end 20 of the test vessel for connection to an appropriate heat source.

The pipe loop heat exchanger 28 may be situated at about the midlevel of the test vessel above a conventional manway 32 in the lower portion of the inlet end 20 of test vessel 16.

While not shown, the test vessel 16 may also be internally fitted with a conventional flow spreader, diffusion baffle and sand pan. An auxiliary box 34 may also be secured to one side test vessel 18 for supporting a plurality of nozzles 36 comprising sample ports for internal pipes which terminate at various elevations inside the test vessel and allow manual investigation of fluid gravity segregation. The sample ports are valve controlled, as indicated at 38, and appropriate valve controlled plumbing 40 is hooked up beneath the sample ports 36 for draining away the sampled fluids.

At a location remote from the inlet end 20, the test vessel 16 is fitted with a gas removal means comprising an upstanding auxiliary chamber 48 whose lower end opens into communication with the interior of the test vessel. The chamber 48 has a domed upper end 50 communicating through a flanged fitting with one end of a gas exhaust pipe string designated generally by the numeral 52. The pipe string 52 includes a horizontal segment 54 fitted with a pressure relief 56 and an assembly 58 of a pressure gauge, ball valve and sample valve. The string segment 54 extends beyond the outlet end 22 of the test vessel to join the upper end of a vertical segment 60 of the gas exhaust pipe string. This segment 60 extends to a level beneath test vessel 16 to open into communication with one end of another horizontal segment 62 of the gas exhaust pipe string which may incorporate a manual on-off valve 64. The downstream end portion of segment 62 is fitted with a preferably pneumatically powered dump valve 66, e.g., Kimray model 230-SMT-S-O, that is normally closed and terminates in a flanged fitting 68 for the hook-up of a collection manifold (not shown) leading to a collection tank for fluids withdrawn from the test vessel 16.

Figure 3:
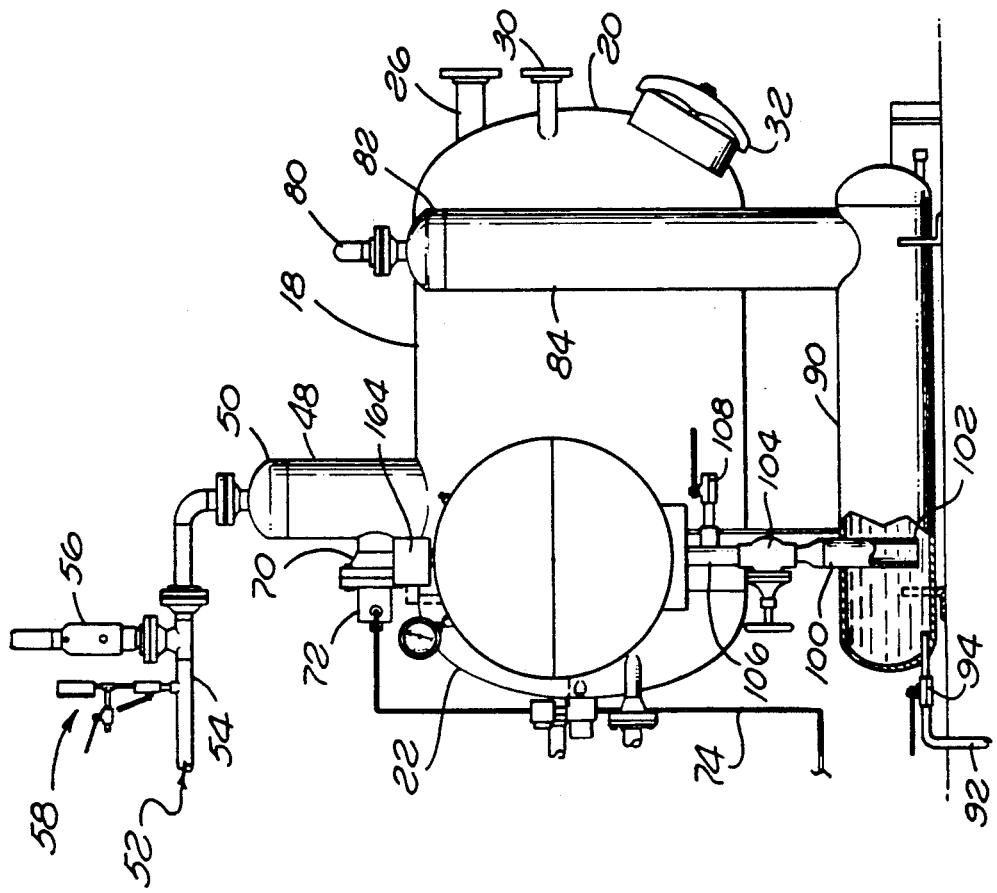
FIG. 3 is a partial side elevational view.

Referring to FIG. 3, a side of the auxiliary chamber 48 is fitted with a float valve means 70 which, in turn, is coupled to a solenoid controlled pneumatic valve actuator 72. A pneumatic line 74 is operatively connected between dump valve 66 and actuator 72. While not shown, it will be understood that the float valve means 70 incorporates a float positioned within auxiliary chamber 48 that senses a gas/liquid interface to operate a switch to activate and deactivate the pneumatic valve controller 72 to open or close dump valve 66.

Adjacent to the inlet end of test vessel 16, an interconnecting pipe 80 extends from the top of the main section 18 of the vessel horizontally to a domed upper end portion 82 of a vertically disposed downcomer 84. As indicated in FIG. 1, the elbows comprising opposite end portions of interconnecting pipe 80 are interconnected in fluid communication with the vessel 16 and downcomer 84 by means of flanged fittings 86 and 88 respectively. The downcomer 84 may comprise an essentially cylindrical duct of relatively large diameter as compared to the diameter of interconnecting pipe 80 and has its lower end positioned at a level beneath vessel 16 to open into fluid communication with one end of a horizontally disposed manifold 90. The manifold 90 may also comprise a cylindrical duct formed with domed opposite ends and having a cross sectional area preferably at least as great as that of the downcomer 84. At one end, a water supply pipe 92 under the control of a valve 94 opens into fluid communication with the interior of the manifold 90, the other end of the supply pipe 92 being connected to a source of fresh water.

In the end portion of the manifold 90 adjacent to the outlet end 22 of the test vessel, the manifold is rigidly fitted with an upstanding pipe 100 projecting radially from the manifold. An inner end 102 of pipe 100 opens into fluid communication with the interior of the manifold 90 within the lower portion of the manifold in close proximity to the bottom wall of the manifold to be lower than any water/emulsion interface that may occur within the manifold. The outer upwardly projecting portion of pipe 100 is fitted with a coaxial valve 104 whose upper end coaxially supports a length of pipe 106 that on one side is fitted with a bleed valve 108. As is shown in FIG. 4, an upper end of the pipe section 106 is threadedly engaged with a nipple 110 of a plate 112 that serves as part of a supporting structure for a pressure vessel designated generally at 114.

The accumulator or vessel 114 comprises a semispherical upper half 116 joined, as by welding 118, to a lower substantially semi-spherical shell 120. The bottom of the lower shell 120 is centrally formed with an opening within which a cylindrical ring 122 is secured, as by welding 124. Disposed within the vessel 114 is a flexible bladder 126 of oil resistant rubber such as neoprone or the like comprising integral portions 126a and 126b. The bladder 126 is so molded that the portion 126a is flexible displaceable from the solid outline position shown in FIG. 4 to a spherical condition in which it would be nestingly engaged within the top portion 116 of the bladder vessel. The lower portion 126b of the bladder matingly conforms to the inner surface to the substantially semi-spherical bottom portion 120 of the bladder vessel and has a central opening defined by a continuous integral bead 130 that is seated within a complementarily shaped continuous groove formed at the inner end of the ring 122.

The cross sectional area of the passage through the ring 120 is sized sufficiently large that the prefabricated bladder 126, in a collapsed condition, can be passed therethrough for insertion into the bladder vessel 114. The bead 130 of the bladder can then be seated on the groove formed at the inner end of the ring 122 and sealingly clamped in place by the plate 112. The plate 112 itself is of somewhat ellipsoidal configuration in plan view, as indicated in FIG. 5, with a sufficiently small minor diameter that the plate may also be inserted through the ring 122. The underside of the plate 112, at points along the major axis of the plate and on opposite sides of the nipple 110, has a pair of brackets 136 rigidly secured thereto. These brackets are adapted to seat the undersides of the heads of a corresponding pair of bolts 138, the shanks of which pass through openings in a pair of clamping straps 140 of channel shaped cross sectional configuration. The outer ends of the pair of bolts 138 receive nuts 142 that, when run up against the undersides of the channel clamps 140, clamp the opposite ends of the straps against the underside of the ring 122 to draw the plate 112 against the inner end of ring 122 to clamp the vessel 114 in place and to effect a fluid tight seal of the bladder bead 130 against the inner end of the ring 122.

The central area of the plate 112 in alignment with the passage through the pipe section 106 is formed with a plurality of holes 146 in a major portion and an orifice 148 in an offset sector. On its inside face, the plate 112 is rigidly fitted with a bar 150 of shallow inverted U-shaped configuration that clamps a flapper valve 152, which may be made of a sheet of rubber or the like, against the inside face of the plate 112. A root end portion 154 of the valve flap is wider than the body portion of the flap and abuts a rod or strap 156 that is fastened to the inner face of the plate 112. The valve 152 is thus held against displacement laterally with respect the plate 112 while a free edge 158 of the body portion of the flapper valve is freely movable between the dotted outline and solid outline positions indicated in FIG. 7. The body portion of the check valve 152 obturates only the holes 146 of the plate 112 when closed, while the orifice 148 remains open at all times.

As is apparent, the bladder 126 divides the interior of the accumulator vessel 114 into a pair of chambers whose volume is mutually inversely variable, proportionally to the displacement of the bladder by a difference of the gas and liquid pressures on the opposite sides thereof. Thus, the volume of the vessel 114 outside of the bladder 126 comprises a gas chamber 160 while the inside of the bladder that communicates with liquid passing through the pipe section 106 comprises a liquid chamber 162. In operative association with the gas chamber 160, the top central portion of the top shell 116 of the bladder vessel is fitted with a high-low pressure switch 164 on opposite sides of which are other fittings for a pressure gauge 166 and a frangible or high pressure disk relief valve 168. Preferably, power switch 164 comprises an Allen-Bradley model ALB 836 C 65J.

The outlet end 22 of test vessel 16 has a water outlet or discharge nozzle 170 connected to one end of a pipe string 172. The nozzle 170 is fitted in a lower portion of the outlet end 22 into communication through an elbow with an upper end of a vertically extending section 174 of the pipe string. The lower end of the section 174 is disposed beneath test vessel 16 and communicates with one end of a horizontally disposed section 176 of the pipe string having an outer end terminating in a flanged fitting 178 which can be hooked up to the collection manifold leading to a tank for the collection of the fluids dumped from the apparatus. At an intermediate point, the pipe string section 176 has a meter 180 mounted in operative association therewith for measurement of the quantity of free water dumped from the test vessel. On opposite sides of the meter 180, the pipe section 176 may also incorporate a manual shut-off valve 182 and a pair of prover connection valves 184 separated by a shunt valve 186.

In its downstream end portion, the pipe string section 176 has a normally closed pneumatic dump valve 188. The valve 188 is pneumatically actuatable by means of a compressed air line 190 having one end operatively connected to an actuator 192, which may be a solenoid controlled selector valve that is electrically coupled to a switch of an oil/water interphase probe 194. The probe 194 is a commercially available type whose inner end within the test vessel senses the difference in electrical capacitance between oil emulsion and free water and is secured to the outlet end 22 of the test vessel at a higher elevation than the location of water nozzle 170. The probe may, for example, be a RobertShaw 304-B (Probe-740-B1-A18). As is indicated by the dotted line 196, the actuator 192 is electrically coupled to the high-low pressure switch 164 atop the bladder vessel 114 through the switch mechanism of the probe 194.

Figure 2:
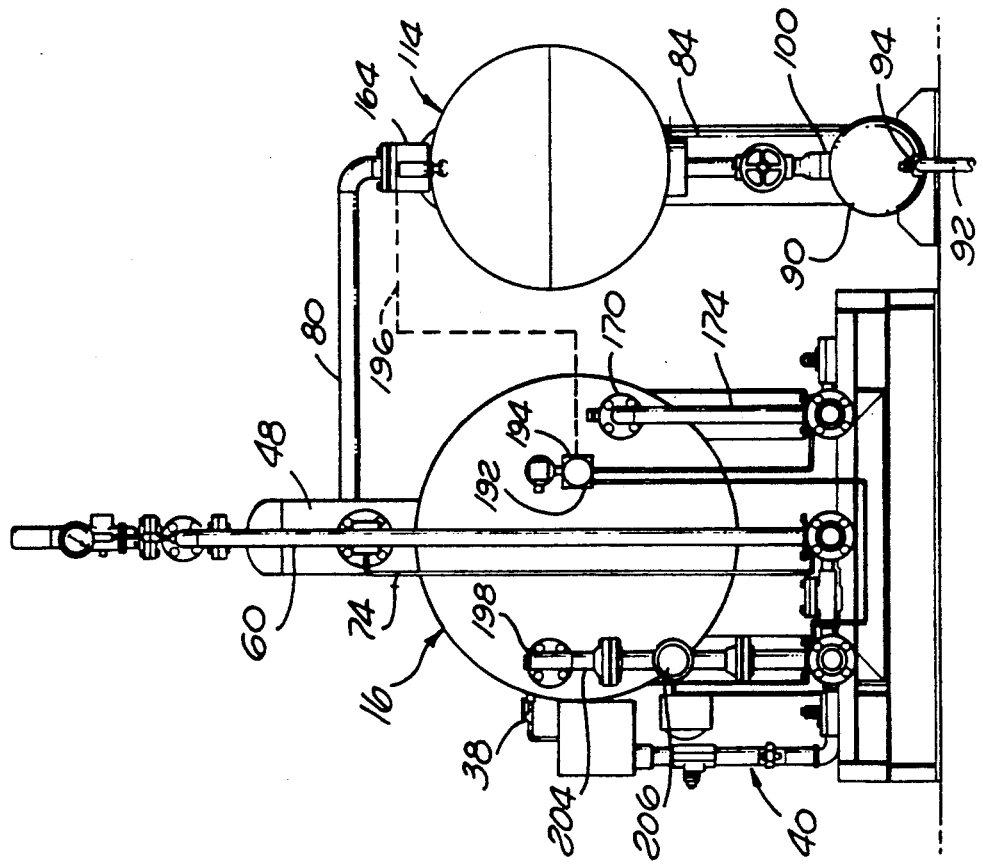
FIG. 2 is an end elevational view of the apparatus of FIG. 1.

Outlet end 22 of the test vessel is also fitted with an emulsion discharge nozzle 198. As is shown in FIG. 2, nozzle 198 is positioned at an elevation above those of the probe 194 and water outlet nozzle 170 and communicates with a pipe string, designated generally by the numeral 200, whose downstream end has a flanged fitting 202 for connection to the collection means for the fluids dumped out of the test vessel 16.

The pipe string 200 includes a vertical section 204 leading from the nozzle 198 to a point below the test vessel. The vertical section 204 of the pipe string incorporates a water cut probe 206 which, for example, may be a Hydril model NOC-200 that records the percent of water contained in the oil/water emulsion. A horizontal section 208 of pipe string 200 contains a meter 210 to measure the volume of oil emulsion passing through the pipe string. This meter may be a Floco meter, model F-500. The horizontal section 208 of pipe string 200 may also have a pair of prover valve connections 184, shunt valve 186 and a manual valve 182. The downstream end portion of the pipe string 200 has a normally closed pneumatic dump valve 212 which may also be pneumatically operated by the actuator 192 by means of an air line 214.

The operation of the illustrated embodiment of the invention is as follows:

Oil well fluids are continuously pumped into the test vessel 16 via the inlet nozzle 26 at a substantially constant rate. Initially, the dump valves 66, 188 and 212 are closed. If present in the produced well fluids, gas is continuously drawn out of the test vessel through the gas exhaust pipe string 52 under control of the float switch mechanism 70. More specifically, gas if present in the pipe string 54 behind the closed dump valve 66 and if under sufficient pressure, lowers the gas/emulsion interface within the auxiliary chamber 48 sufficiently to actuate the float switch mechanism and actuator 72 to effect opening of dump valve 66 via pneumatic control line 74. As the liquid volume within the exhaust pipe string 52 increases, the float of switch mechanism 70 rises within auxiliary chamber 48 to effect the activation of the float switch means and consequent closing of dump valve 66.

As the test vessel 16 is essentially gas free and as dump valves 66, 188 and 212 are closed, the lighter emulsion within the test vessel overflows through interconnecting pipe 80 and into the downcomer 84. As the pressure within the liquid packed test vessel increases under the head of the incoming well fluid, the emulsion/fresh water interface within the downcomer 84 is displaced downwardly to, in turn, effect displacement of fresh water out of the manifold 90 upwardly through the upstanding pipe 100, open valve 104 and pipe section 106 and into the liquid chamber 162 of the bladder vessel 114. The flapper valve 152 opens to freely admit the fresh water into the bladder so that the bladder portion 126a is deformed upwardly from the position illustrated in FIG. 4 to expand towards contact with the inner surface of the upper shell 116 of bladder vessel 114. Concurrently, the pressure of the inert nitrogen within the gas chamber 160 increases to a predetermined upper level, e.g., 135 pounds psig. Concurrently, any pressure shock waves generated from the producing well into the fluid packed main test vessel are transmitted into and absorbed by the gas damped bladder 126.

When the gas pressure within the bladder vessel accumulates to the predetermined high point, high-low pressure switch 164 closes to energize the circuit 196 to the switch of interface probe 194. The interface probe in turn switches the circuit as a function of the liquid with which the probe is then in contact internally of the test vessel. Thus, if the emulsion/water interface within the test vessel has lowered sufficiently for the probe to be in contact with the lighter emulsion, the probe switches to energize a solenoid of the valve actuator 192 for pneumatically opening the dump valve 212 in the emulsion dump string 200. Alternatively, if the emulsion/water interface within test vessel 116 has raised sufficiently for the interface probe 194 to be in contact with the free water, the probe switches the valve actuator 192 for actuating the water dump valve 188 through pneumatic line 190.

After the valve actuator 194 has been actuated to release either emulsion or water, pressure accumulated within the test vessel is gradually relieved and the gas chamber 160 of the bladder vessel 114 enlarges to expel water out of the water chamber 162. The passage of water out of the bladder vessel closes the check valve flap 152 so that the water is expelled at a rate controlled by orifice 148. The emulsion or water, as the case may be, is thus exhausted through the corresponding outlet nozzle and pipe string and meter at a rate to avoid overrunning of the meter. When the pressure within the bladder vessel lowers to a preset low point, the high-low pressure switch opens or is de-energized to effect closure of the corresponding normally closed dump valve. This cycle then repeats itself.

As will now be apparent, the constant elimination of gas from the test vessel avoids the explosion hazard associated with three-phase well testers. Also, as the free water and emulsion are gravity segregated and separately dumped, the water cut probe in the emulsion discharge pipe continues to function properly and is not overwhelmed by the free water phase of the well fluid, which is separately metered in the water dump pipe.

Additionally, it should be noted that as the water precharge manifold is sized to contain a volume of cool fresh water at least equal to the volume of the bladder vessel 114, the rubber bladder 126 is at all times protected from exposure to the corrosive well fluid and heat therein that may have entered with well fluid or was generated by the heat exchanger loop 28. Further, the oil and water dump volumes are substantially larger than those achievable with prior oil well testers of the gravity segregation type, in the neighborhood of 20-30 gallons, thus reducing the number of inefficient acceleration and deceleration periods for the meters 180 and 210. As will be apparent, the apparatus lends itself to remote automation of the metering function since the meters 180 and 210 and water cut probe 206 can be coupled to a central computer (as could a meter in the gas line, if installed).

FIG. 8 schematically illustrates the electro-pneumatic control system of the invention in the context of a retrofit embodiment of the invention. In this case, the test vessel 16 retains a weir box W such as is found in prior art well testers but, as the apparatus operates liquid packed, the upper edge of the weir box does not define a gas/liquid interface but need only be of sufficient height that the oil emulsion/water interface not be displaceable above the upper edge of the weir. Oil emulsion thus always overflows over the upper edge of the weir into the weir box from which it may be periodically dumped downwardly through an oil discharge pipe string 200-1. Similarly, the water pipe discharge string 172-1 may be positioned to dump from the bottom of the test vessel. Also, if the weir box W extends completely diametrally across the test vessel 16, rather than being situated only to one side of the test vessel, the interface probe 194 is modified to have its probe P projecting inwardly beyond an inner wall of the weir to be positioned within that area of the test vessel in which the oil emulsion/water interface is vertically displaceable between dump cycles. As will be apparent, in all other material respects the apparatus and method of the alternative retrofit embodiment are as described above with reference to the preferred embodiment.

I claim:

1. An oil well tester comprising:
   a test vessel having an inlet through which oil well production fluid can be inducted into said test vessel to undergo gravity segregation of different phases of the production fluid;
   a gas removal means operatively associated with the uppermost portion of the interior of said test vessel, said gas removal means being responsive to gas pressure for removing from said test vessel any gas phase of the production fluid within said test vessel, said gas removal means having a first valve means;
   a first liquid discharge means having an upstream end in fluid communication with a lower region of said test vessel,
   said first discharge means having a second valve means operatively associated with a downstream end thereof;
   a second liquid discharge means having an upstream end in fluid communication with an upper region of said test vessel,
   said second discharge means having a third valve means operatively associated with a downstream end thereof;
   an accumulator means divided into gas and liquid chambers of mutually variable volumes such that said gas chamber is substantially hermetically sealed, said liquid chamber being operatively associated in fluid communication with the upper region of said test vessel through an opening in said liquid chamber;
   an actuator means operatively associated with said second and third valves for opening a selected one of said second and third valves;
   a selector means operatively associated with said actuator means and with an intermediate level of said test vessel for selecting one of said second and third valves for opening as a function of the specific gravity of a liquid phase present at the intermediate level of said test vessel; and
   a means operatively associated with said gas chamber of said accumulator means for energizing said actuator means to open and close a selected one of said pair of second and third valves as a function of high and low pressures, respectively, of a gas contained within said gas chamber.

2. An oil well tester as in claim 1 in which:
   said liquid chamber of said accumulator means is operatively associated with the upper region of said test vessel through a water manifold;
   said water manifold being positioned relative to said test vessel such that a liquid in the upper region of said test vessel is in fluid communication with an upper region of said water manifold through a downcomer;
   said manifold, at a location spaced from said downcomer, having a pipe for fluid communication between a lower region of said manifold and said liquid chamber of said accumulator means, said liquid chamber of said accumulator means being positioned above said water manifold.

3. An oil well tester as in claim 2 in which:

said pipe between the lower region of said manifold and said liquid chamber of said accumulator means has a check valve means to freely admit liquid displaced out of the lower region of said manifold into said liquid chamber of said accumulator means, said check valve means operating to prevent displacement of liquid out of said liquid chamber through said pipe and into the lower region of said manifold;

said pipe also containing an orifice unobstructed by said check valve means that permits the free displacement of liquid into and out of said liquid chamber of said accumulator means.

4. An oil well tester as in claim 2 in which:

said accumulator means comprises a pressure vessel containing a flexible bladder that divides said pressure vessel into said gas and liquid chambers.

5. An oil well tester as in claim 4 in which:

said water manifold has a volume at least equal to the volume of said pressure vessel.

6. An oil well tester as in claim 1 in which:

said gas removal means comprises an auxiliary chamber on said test vessel that has a lower end opening into communication with the uppermost portion of the interior of said test vessel; and said gas removal means further comprises a float switch means on said auxiliary chamber that is responsive to the level of a gas/liquid interface within said auxiliary chamber, said float switch means being operatively associated with said first valve means to effect opening of said first valve means to remove gas from said test vessel through said auxiliary chamber in response to a lowering of a gas/liquid interface within said auxiliary chamber.

7. An oil well tester as in claim 1 in which:

said means for energizing said actuator means comprises a high-low pressure switch that remains closed between said high and low pressures.

8. An oil well tester as in claim 1 in which:

said selector means comprises a probe that is responsive to the capacitance of a liquid present at the intermediate level of said test vessel to open a corresponding one of said second and third valves.

9. An oil well tester as in claim 1 in which:

a water cut probe is operatively associated with said downstream end of said second liquid discharge means.

10. An oil well tester comprising:

a test vessel having an inlet through which oil well production fluid can be inducted into said test vessel to undergo gravity segregation of different phases of the production fluid;

a gas removal means having an upstream portion operatively associated with the uppermost portion of the interior of said test vessel for discharging from said test vessel any gas phase of the production fluid within said test vessel;

a first normally closed valve means operatively associated with a downstream end portion of said gas removal means;

a first actuator means operatively associated with said gas removal means for opening said first normally closed valve means in response to pressure of a gas phase of the production fluid within said test vessel;

a first liquid discharge means having an upstream end in fluid communication with the lower region of said test vessel;

a second normally closed valve means operatively associated with a downstream portion of said first liquid discharge means;

a second liquid discharge means having an upstream portion in fluid communication with an upper region of said test vessel;

a third normally closed valve means operatively associated with a downstream portion of said second liquid discharge means;

a second actuator means operatively associated with said second and third normally closed valves for opening a selected one of said second and third valves;

a selector means operatively associated with said second actuator means and with an intermediate level of said test vessel for selecting one of said second and third valves for opening as a function of the specific gravity of a liquid phase present at the intermediate level of said test vessel;

a water manifold positioned adjacent to said test vessel having pipe means such that a liquid in an upper region of said test vessel can overflow into an upper region of said water manifold;

an accumulator means comprising a pressure vessel divided into gas and liquid chambers of mutually variable volumes, said gas chamber being substantially hermetically sealed, said liquid chamber being operatively associated in fluid communication with a lower region of said water manifold through an opening in said liquid chamber; and a means operatively associated with said gas chamber of said pressure vessel for energizing said second actuator means to open and close a selected one of said second and third valves as a function of high and low pressures, respectively, of a gas contained within said gas chamber.

11. An oil well tester as in claim 10 in which:

said gas removal means comprises an auxiliary chamber on said test vessel that has a lower end opening into communication with the uppermost portion of the interior of said test vessel, said gas removal means further comprising a float switch means operatively associated with said auxiliary chamber that is responsive to the level of a gas/liquid interface within said auxiliary chamber, said float switch means being operatively associated with said first actuator mean to effect opening of said first normally closed valve means to remove gas from said test vessel through said auxiliary chamber in response to a lowering of a gas/liquid interface within said auxiliary chamber.

12. An oil well tester as in claim 10 in which:

said liquid chamber of said pressure vessel has fluid communication with the lower region of said water manifold through an upstanding pipe mounted on said manifold, said pressure vessel being mounted on an upper end of said pipe, said water manifold having a volume at least equal to the volume of said pressure vessel.

13. An oil well tester as in claim 12 in which:
said pipe between the lower region of said manifold and said liquid chamber of said pressure vessel has a check valve means to freely admit liquid displaced out of the lower region of said manifold into said liquid chamber of said pressure vessel,
said check valve means operating to prevent displacement of liquid out of said liquid chamber through said pipe and into the lower region of said manifold;
said pipe also containing an orifice unobstructed by said check valve means that permits the free displacement of liquid into and out of said liquid chamber of said pressure vessel.

14. An oil well tester as in claim 10 in which:
said means for energizing said second actuator means comprises a high-low pressure switch that remains closed between said high and low pressures.

15. An oil well tester as in claim 10 in which:
said selector means comprises a probe that is responsive to the capacitance of a liquid present at the intermediate level of said test vessel to open a corresponding one of said second and third valves.

16. A method of oil well testing comprising:
inducting oil well production fluid into a test vessel for gravity segregation of the phases of the production fluid, while maintaining the oil emulsion and water outlets of the test vessel closed and while removing from the test vessel any gas phase of the production fluid, whereby the test vessel becomes liquid packed with emulsion over water,
overflowing the emulsion from the test vessel into communication with one side of a pressure accumulator to compress a gas isolated on the other side of the accumulator
alternately detecting the specific gravity of the oil emulsion and the water at an intermediate level of the test vessel,
upon the compression of the gas of the accumulator to a predetermined high pressure, opening that one of the oil and water outlets of the test vessel corresponding to the specific gravity of the liquid detected at the intermediate level of the test vessel, whereby the compressed gas of the accumulator effects displacement of the selected liquid from the test vessel, and
upon decompression of the gas of the accumulator to a predetermined low pressure, closing the open one of the oil and water outlets.

17. A method of oil well testing as in claim 16 further comprising:
interposing a charge of fresh water between the overflowing emulsion and said one side of the accumulator.

* * * * *